United States Patent
Vilcelaru (10) Patent No.: US 10,343,505 B2
(45) Date of Patent: Jul. 9, 2019

(54) METHOD OF FUNCTIONING THE RETRACTABLE HARD TOP SYSTEM FOR CONVERTIBLE VEHICLES

(71) Applicant: Daniel Vilcelaru, Strada Fabricii (RO)

(72) Inventor: Daniel Vilcelaru, Strada Fabricii (RO)

(*) Notice: Subject to any disclaimer, the term of this patent is extended or adjusted under 35 U.S.C. 154(b) by 0 days.

(21) Appl. No.: 15/568,516

(22) PCT Filed: Jun. 30, 2015

(86) PCT No.: PCT/RO2015/000016
§ 371 (c)(1),
(2) Date: Oct. 23, 2017

(87) PCT Pub. No.: WO2016/175673
PCT Pub. Date: Nov. 3, 2016

(65) Prior Publication Data
US 2018/0111462 A1 Apr. 26, 2018

(30) Foreign Application Priority Data

Apr. 27, 2015 (RO) .................................. 15-000287

(51) Int. Cl.
*B60J 7/20* (2006.01)
*B60J 7/14* (2006.01)
*B60J 1/18* (2006.01)
*B60J 7/00* (2006.01)

(52) U.S. Cl.
CPC ............... *B60J 7/20* (2013.01); *B60J 1/1823* (2013.01); *B60J 7/0053* (2013.01); *B60J 7/148* (2013.01); *B60J 7/201* (2013.01); *B60J 7/203* (2013.01)

(58) Field of Classification Search
CPC ... B60J 7/20; B60J 7/0053; B60J 7/148; B60J 7/203; B60J 7/201; B60J 1/1823
USPC ..... 296/107.08, 108, 107.17, 107.07, 146.14
See application file for complete search history.

(56) References Cited

U.S. PATENT DOCUMENTS

| 3,782,776 | A | * | 1/1974 | Ormont | .................. | B60J 7/1642 |
| | | | | | | 296/100.1 |
| 4,009,902 | A | * | 3/1977 | Yoxtheimer | ........... | B60J 7/1642 |
| | | | | | | 296/216.02 |
| 7,172,242 | B2 | * | 2/2007 | Heselhaus | .................. | B60J 7/20 |
| | | | | | | 296/107.09 |
| 2005/0088008 | A1 | * | 4/2005 | Quindt | .................. | B60J 1/1823 |
| | | | | | | 296/107.08 |

(Continued)

FOREIGN PATENT DOCUMENTS

| DE | 10025051 C1 | 11/2001 |
| DE | 102004021552 A1 | 12/2005 |

(Continued)

*Primary Examiner* — Jason S Morrow
*Assistant Examiner* — E Turner Hicks (57) ABSTRACT

Method of functioning the retractable hard top system for convertible vehicles which implies splitting the ceiling in the middle (through the longitudinal axis of the vehicle), moving the rear window with the frame-like area around it on top of the trunk lid, opening the upper areas of the rear wings and folding compactly the remaining components of the roof inside the lateral areas of the trunk. This method significantly increases the usable volume of the luggage compartment and offers an easier access to the items carried in the trunk. Also, this method requires a less complex operation system which leads to less expensive manufacturing and maintenance costs.

4 Claims, 15 Drawing Sheets

(56) References Cited

U.S. PATENT DOCUMENTS

| | | | | |
|---|---|---|---|---|
| 2006/0255619 A1* | 11/2006 | Dickie | ................... | B60J 1/1823 |
| | | | | 296/107.08 |
| 2006/0261630 A1* | 11/2006 | Fleming | ................... | B60J 7/028 |
| | | | | 296/107.08 |
| 2007/0018479 A1 | 1/2007 | Martin | | |
| 2007/0080558 A1* | 4/2007 | Heselhaus | .............. | B60J 7/0061 |
| | | | | 296/107.08 |
| 2014/0292019 A1* | 10/2014 | Ugolini | ................... | B60J 7/146 |
| | | | | 296/107.07 |
| 2015/0076855 A1* | 3/2015 | Vogt | ....................... | B60J 7/1678 |
| | | | | 296/107.17 |
| 2016/0167497 A1* | 6/2016 | Froeschle | .............. | B60J 7/1265 |
| | | | | 296/107.08 |

FOREIGN PATENT DOCUMENTS

| | | |
|---|---|---|
| DE | 102012002298 A1 | 8/2013 |
| EP | 1151884 A1 | 11/2001 |
| EP | 1245419 A1 | 10/2002 |
| EP | 2241466 A1 | 10/2010 |
| WO | 2005095134 A1 | 10/2005 |
| WO | 2007136312 A1 | 11/2007 |
| WO | 2008064695 A1 | 6/2008 |

\* cited by examiner

METHOD OF FUNCTIONING THE RETRACTABLE HARD TOP SYSTEM FOR CONVERTIBLE VEHICLES

FIELD OF THE INVENTION

This invention relates to a method of functioning the retractable hard top for vehicles.

Method of functioning the retractable hard top system for convertible vehicles which implies splitting the ceiling in the middle, moving the rear window on top of the trunk lid and folding compactly the remaining components of the roof inside the lateral areas of the trunk.

BACKGROUND OF THE INVENTION

In the present, the automotive industry proposes two distinct solutions for convertible cars:
  retractable soft top
  retractable hard top The retractable soft top is an articulating structural framework with a flexible cloth or plastic outer skin.

In the extended position, the front end of the articulating framework connects to the top of the windshield frame and the outer skin extends over the passenger compartment.

In the retracted position, the articulating framework with the outer skin folds into a compact form in the area between passenger compartment and the luggage compartment.

In comparison with non-convertible cars, the soft top convertible cars have several disadvantages:
  poor thermal isolation
  poor phonic isolation
  less resistant to break-in attempts The second technical solution offered by the automotive industry for convertible cars is the retractable hard top system. This consists in splitting the hard top in two or more rigid elements that are mechanically articulated and they can be repositioned into a storage area behind the passenger compartment.

Regarding the number of moving elements of the hard top and the way these elements are moved, folded and stacked, there are several design variations and the most common are the "clamshell" design and the "stacking" design.

The most advanced technical solution which provides improved storage efficiency is considered to be the "stacking" design. In this system the hard top is divided in three elements.

When the hard top is retracted using a very complex articulating mechanism, the roof elements are moved and stacked such that the inner surface (with concave shape) of one segment is put over the outer surface of another segment (with convex shape). Placing the concave face of one segment adjacent to the convex face of another segment results in more efficient space utilization.

The ansamble of three segments in "stacking" position is then stored in the luggage compartment by opening the trunk lid.

Disadvantages of this solution:
  a very complex mechanical, electrical and electronic system required which leads to increased costs of production and exploatation
  reduced reliability
  when the hard top is retracted, the system occupies most of the luggage compartment The technical solution that this invention wants to address is the way in which the hard top is divided and the way the mobile parts are repositioned relative to the vehicle's body so that it can be offered a much bigger space for luggage in the trunk and a more easy way of accessing them.

The horizontal area of the hard top is composed from two segments that are located sideways and makes the connection between the front pillars and the back pillars and two symmetric elements in the middle part which split apart in the middle from the top of the windshield frame to the top of the rear window frame.

The first step in the opening process is splitting apart the horizontal elements of the hard top by raising their exterior margins away from the two segment which connect the front pillars and the back pillars.

The rear window with a all-around frame is placed with two moving arms on top of the trunk lid. The frame is shaped in such manner that it forms a small aileron in the rear.

The top of the back wings of the vehicle open sideways and form two access zones to the lateral parts of the trunk.

The connecting segments of the front and rear pillars detach from the top of the front pillar, the rear pillars rotate with the point of rotation on their base, to the rear of the vehicle. The connecting segments rotate with the point of rotation the joining point with the rear pillars, toward the front of the vehicle, approaching the rear pillars.

The rear pillars, the connecting segments and the horizontal elements folds compactly and enter thru the access zones on top of the back wings to the storage areas disposed in the lateral parts of the trunk.

The opening process with closing the top of the back wings of the vehicle.

The closing process of the hard top is carried out by following the steps described above in reverse order.

In the open position of the hard top, in order to be able to operate the trunk lid, the base of the mobile arms that move the rear window and its frame detach from the surrounding area. In this way, the rear window and its frame that are fixed to the trunk lid can move along when opening and closing the lid.

When the closing process of the hard top starts, the base of the mobile arms secures back to the surrounding area.

The advantages of the invention:
  it significantly increases the usable area of the luggage compartment
  it provides an easier access to the luggage compartment
  it requires a less complex articulating mechanism which leads to reduced production costs, reduces maintenance costs and increased reliability.

The present invention provides a method of folding the hard top of convertible vehicles characterized by the fact that the rear window and the frame-like area around it remaining outside the vehicle's body and it is moved and fixed on the trunk lid and the other components of the hard top fold compactly in the left and right sides of the inside of the trunk.

Figure 1:
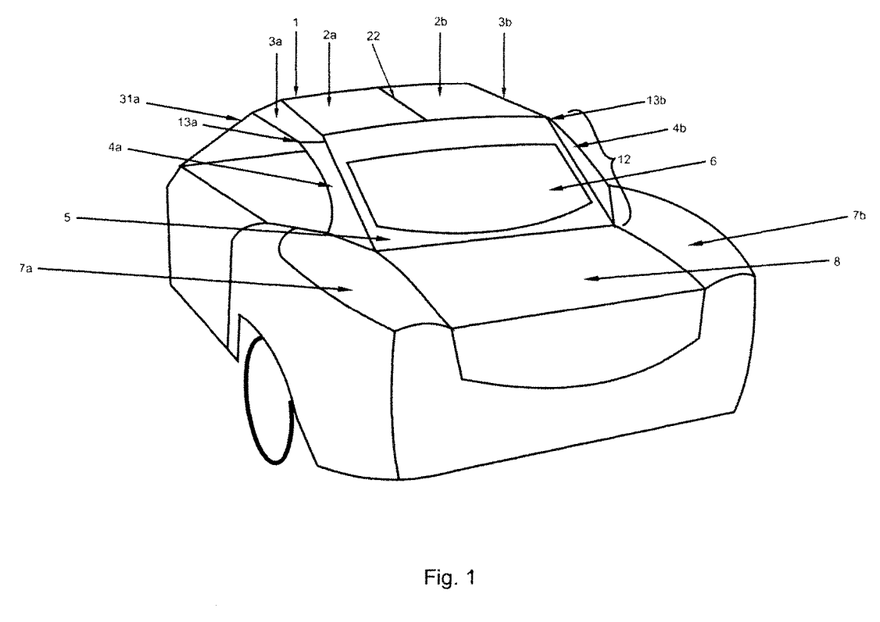
FIG. 1 is a rear left side-elevation view of a part of a vehicle with a retractable hard top in the closed position, according to the present invention.

The following describes an embodiment of the invention in connection with FIGS. 1-15:

FIG. 1 is showing the main components of the convertible system with the closed hard top.

The ceiling is composed of identical horizontal elements 2a and 2b, the connecting horizontal segments 3a and 3b, the rear pillars 4a and 4b and the panel 12 formed by the frame 5 and the rear window 6. There are also shown the upper parts of the rear wings 7a and 7b, the trunk lid 8, the articulating connections 13a and 13b of the segments 3a, 3b and the pillars 4a, 4b, the joining area 22 between the elements 2a and 2b, the upper frame of the windscreen 1 and the front pillar 31a.

Figure 2:
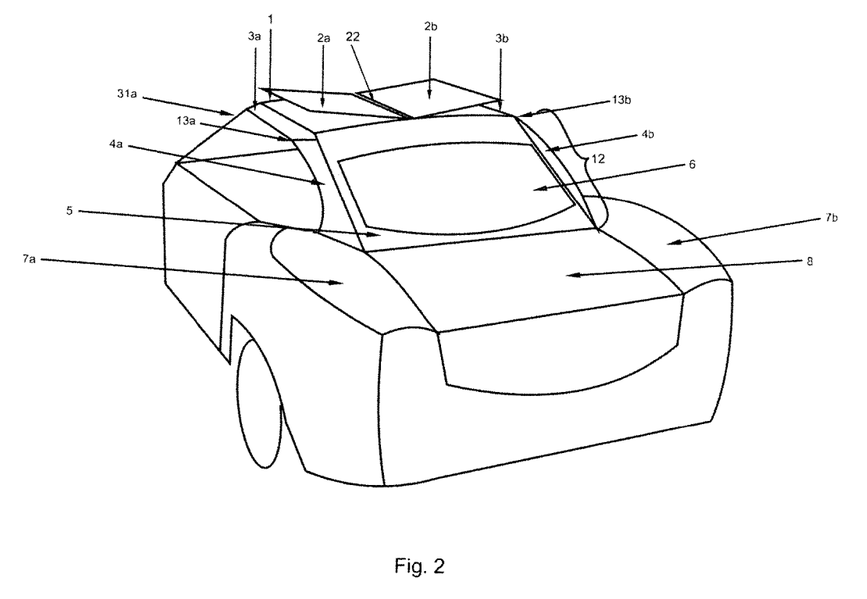
FIG. 2 is a rear left side-elevation view of a part of a vehicle when the first components of the system are moving. It is the beginning of the opening process of the hard top.

FIG. 2 is showing the beginning of the opening process by lifting the outer lateral areas of 2a and 2b away from the segments 3a and 3b, achieving at the same time their division in the area 22.

Figure 3:
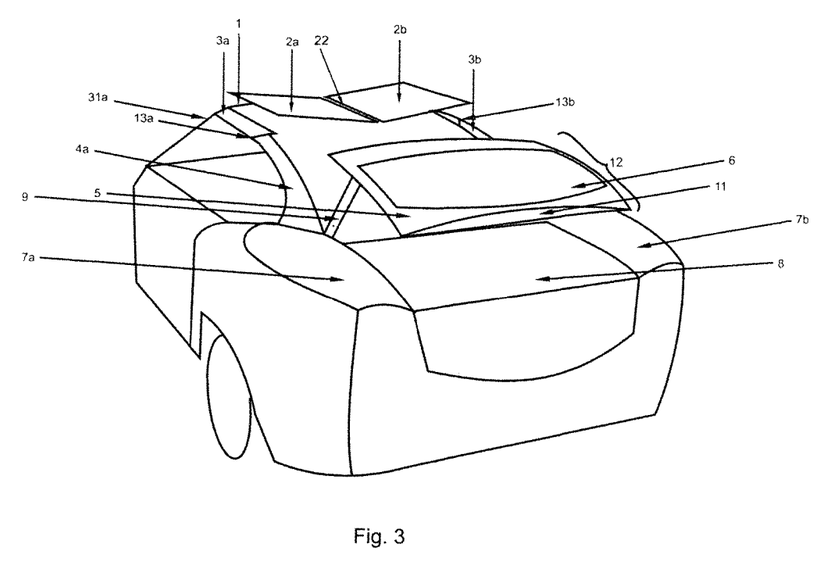
FIG. 3 is a rear left side-elevation view of a part of a vehicle when the rear window and the frame around it are moving towards the trunk lid.
Figure 4:
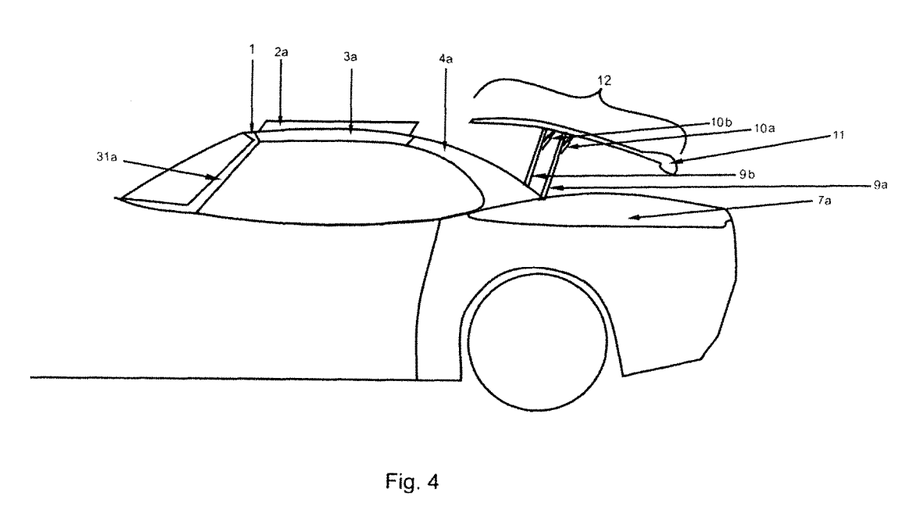
FIG. 4 is a left side-view of a part of a vehicle after the horizontal elements of the hard top are elevated and the rear window and its frame are moving toward the trunk lid.

Further, the panel 12 separates from the rear pillars 4a and 4b with the mobile arms 9a and 9b and it is mowed and fixed on top of trunk lid.

The arms 9a and 9b performs a rotational movement toward the rear of the vehicle with rotation points 99a and 99b (FIG. 4 and FIG. 15) and simultaneously the pistons 10a and 10b push up the panel 12 to ensure parallelism with the trunk lid 8.

The base 15a of the arm 9a and the base 15b of the arm 9b (FIG. 15) disengages from the area 99 so that the panel 12 can follow the movement of the trunk lid 8 when it opens and closes with the hard top open.

Figure 5:
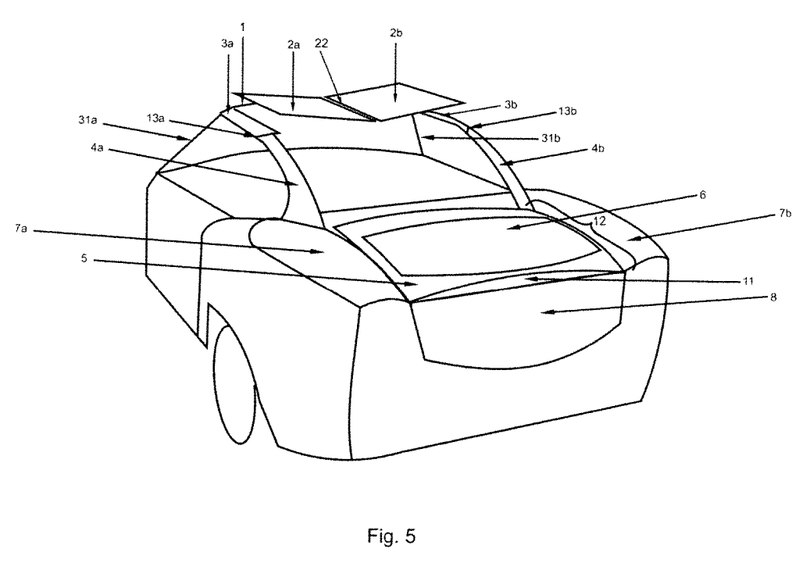
FIG. 5 is a rear left side-elevation view of a part of a vehicle showing the final position of the rear window and its frame on the trunk lid.

FIG. 5 shows the final position of the panel 12 when it is fixed to the trunk lid 8. Panel 12 has the same shape as the horizontal part of the trunk lid 8 and closely follows the shape of the inner sides of the rear wings. At the back end the panel 12 forms a small spoiler 11.

Figure 6:
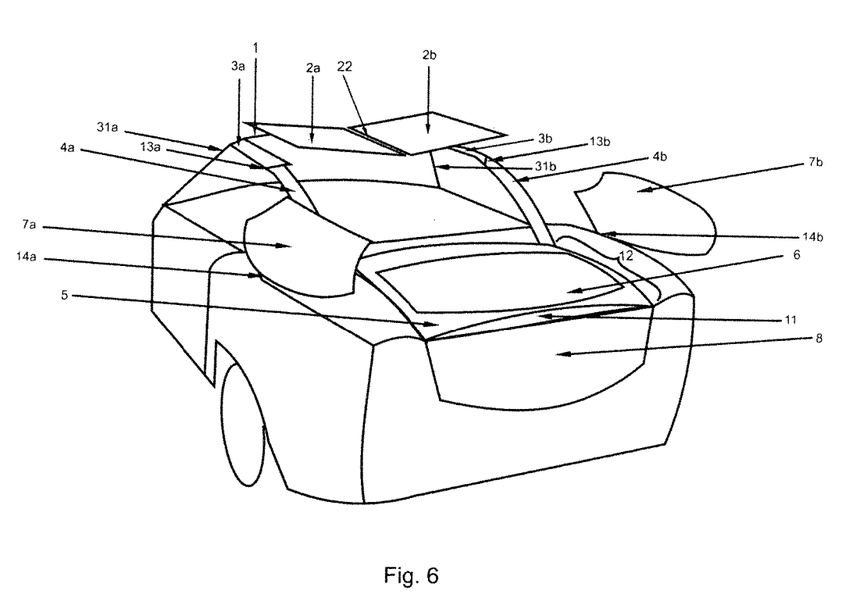
FIG. 6 is a rear left side-elevation view of a part of a vehicle showing the opening of the top of the back wings of the vehicle.
Figure 7:
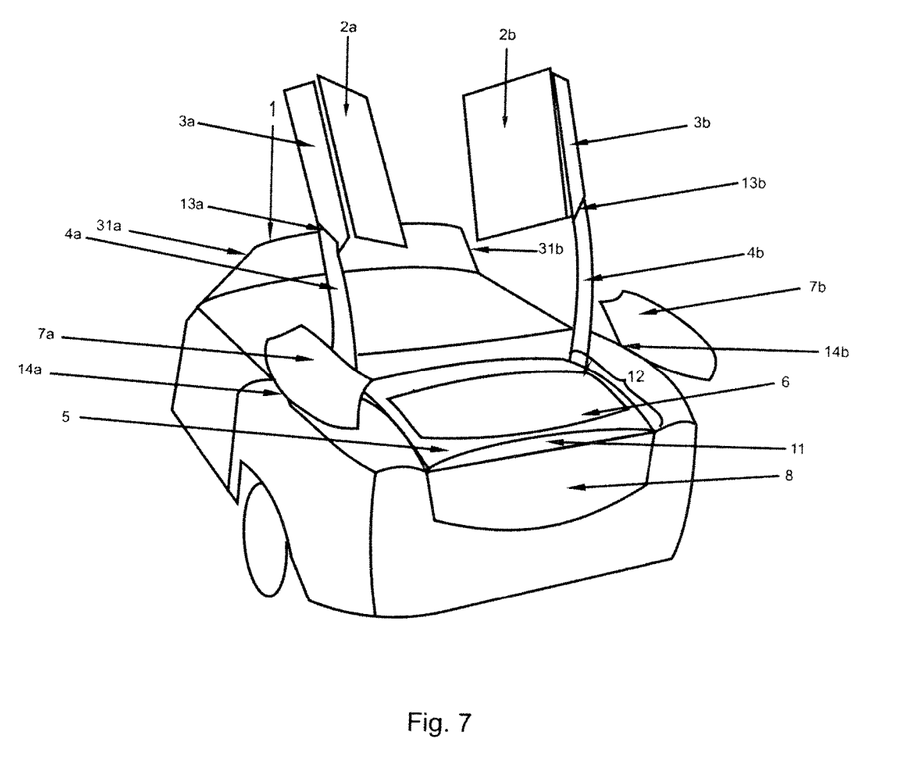
FIG. 7 is a rear left side-elevation view of a part of a vehicle showing the detaching from the front pillars and the move of the hard top components toward the rear of the vehicle.

FIG. 6 shows the next stage of the opening process when the upper parts of the rear wings 7a and 7b rise following a outward circular motion with the rotation points 14a and 14b.

Figure 8:
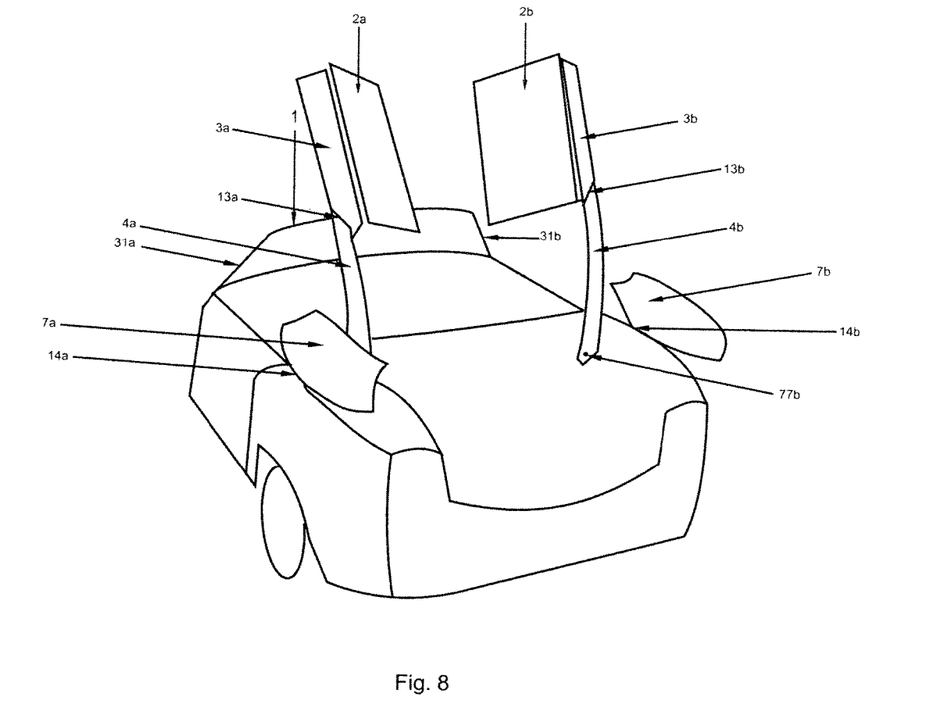
FIG. 8 is a rear left side-elevation view of a part of a vehicle without the trunk lid showing the rotating points of the rear pillars.

The assembly composed of the rear pillar 4a, segment 3a and element 2a and the assembly 4b, 3b and 2b detach from the top of the windscreen frame 1 and rise with a circular motion with points of rotation 77a and 77b toward the back of the vehicle (FIG. 8).

Figure 9:
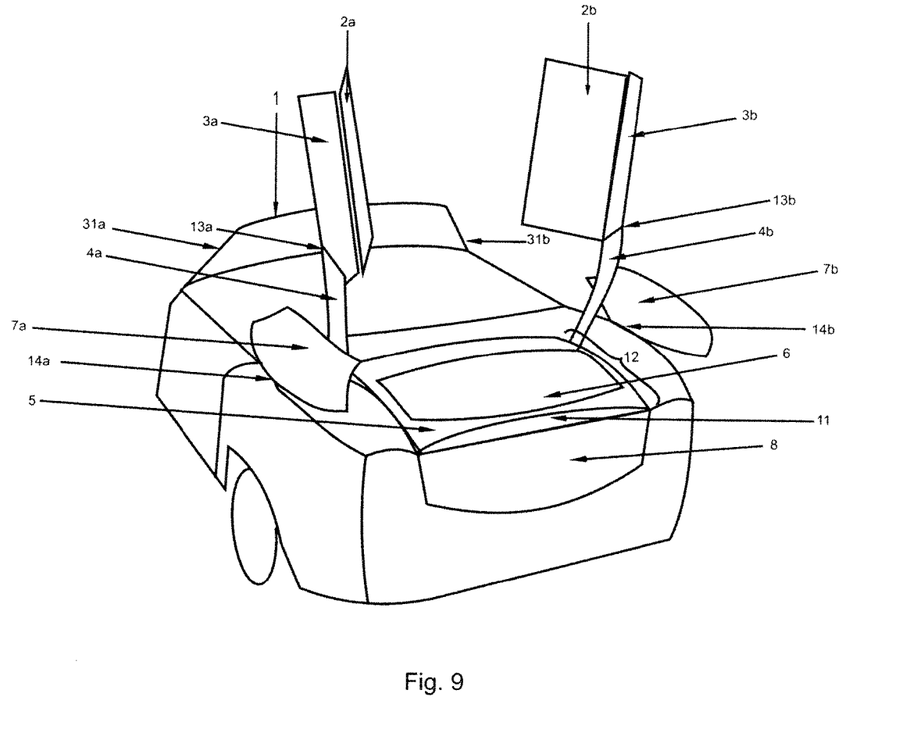
FIG. 9 and FIG. 10 are rear left side-elevation views of a part of a vehicle showing the hard top components moving and folding before entering into the storage area on the left and on the right side of the luggage compartment.
Figure 10:
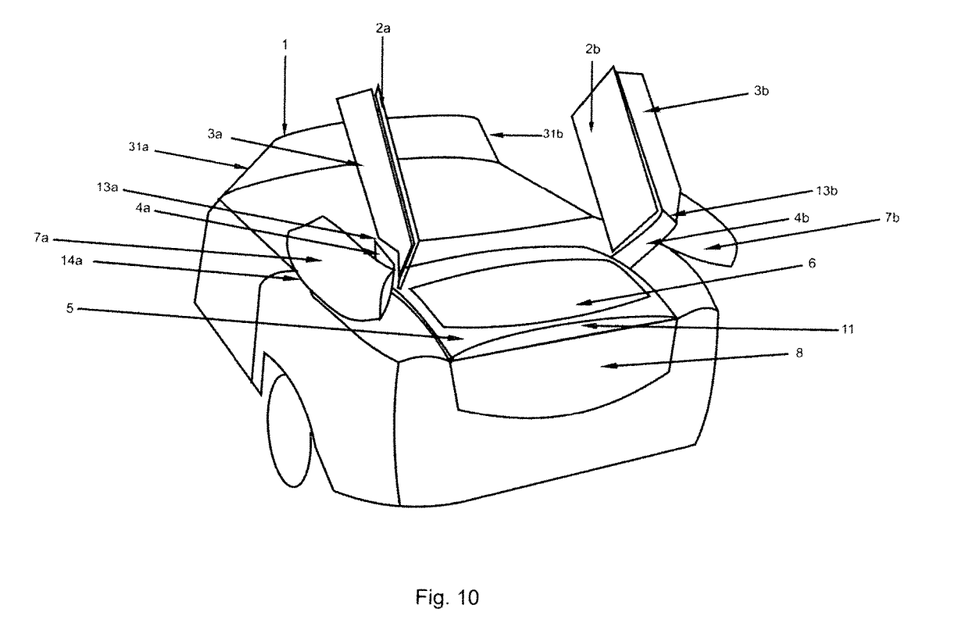
Figure 11:
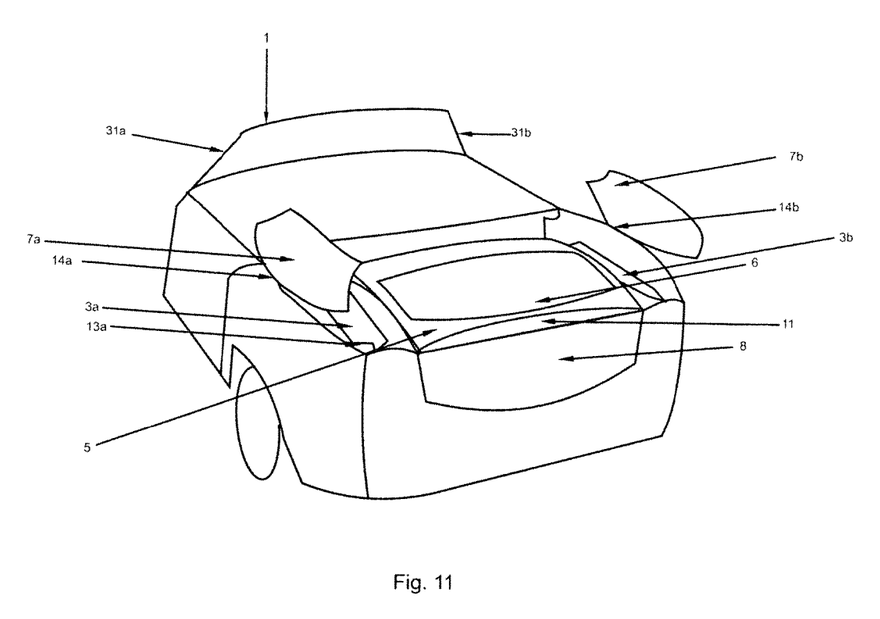
FIG. 11 is a rear left side-elevation view of a part of a vehicle showing the final position of the hard top components in the luggage compartment.

When segments 3a and 3b reach a vertical position, the elements 2a and 2b move their inner parts toward the front of the vehicle (FIG. 9). When 3a forms an angle of approximately 90° with 2a and 3b forms an angle of approximately 90° with 2b, the assembly 3a, 2a and the assembly 3b, 2b start a downward rotation with points of rotation 13a and 13b (FIG. 10).

Figure 12:
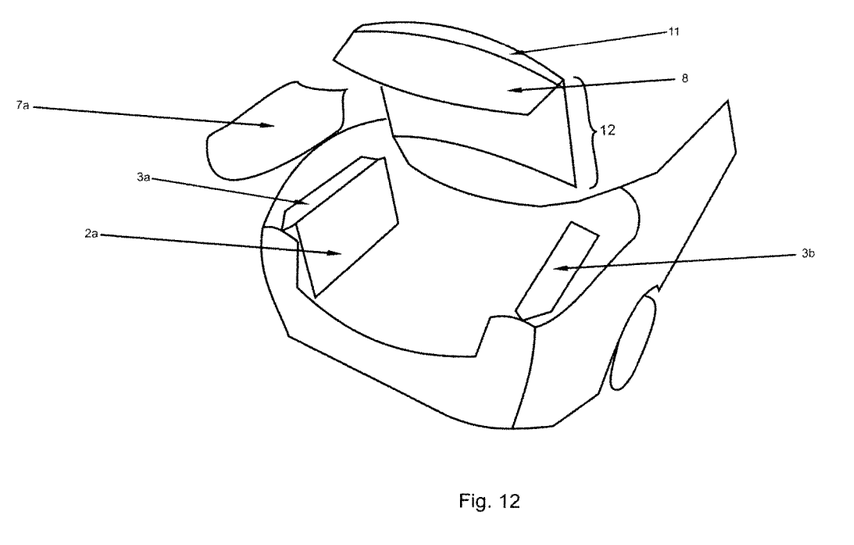
FIG. 12 is a top right rear end view showing the final position of the hard top components in the luggage compartment with the trunk lid open.
Figure 14:
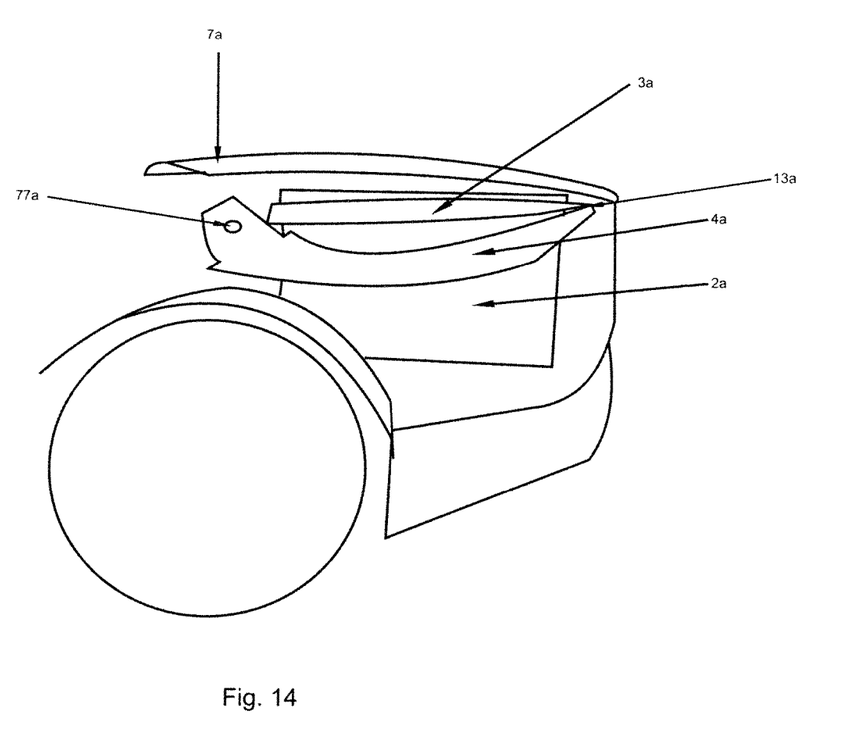
FIG. 14 is a sectional view of the left rear end of the vehicle showing the final position of the hard top components in the open position in the luggage compartment.
Figure 15:
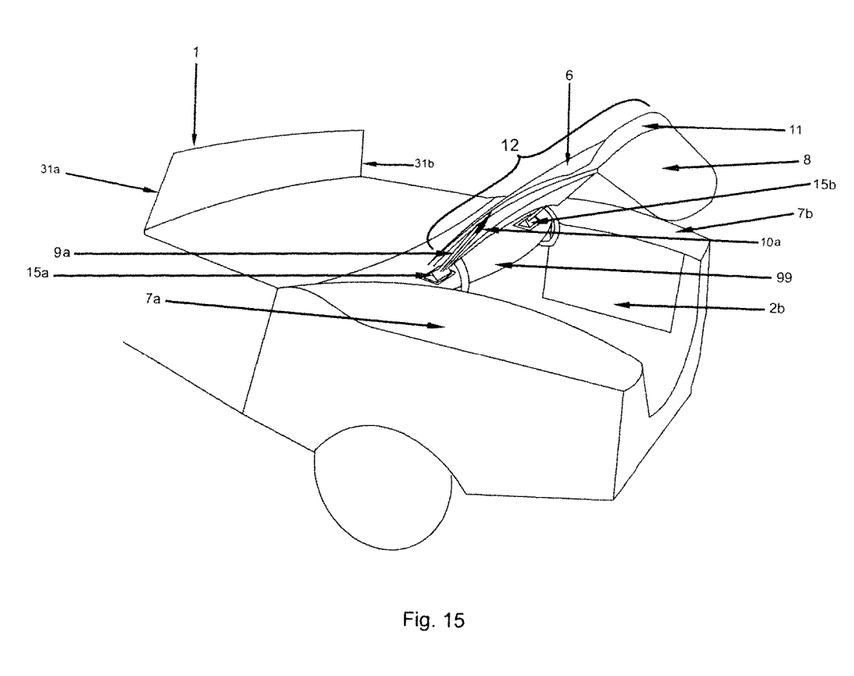
FIG. 15 is a top left rear end view showing the base of the rear window's moving arms that are detached from the surrounding area when the trunk lid is open.

The assembly 4a, 3a and 2a and the assembly 4b, 3b and 2b go into the sides areas of the boot through the apertures provided by 7a and 7b (FIG. 11) following the trajectory imposed by the points of rotation 77a, 77b and 13a, 13b. Their final position inside the trunk is shown in FIG. 12 and FIG. 14.

Figure 13:
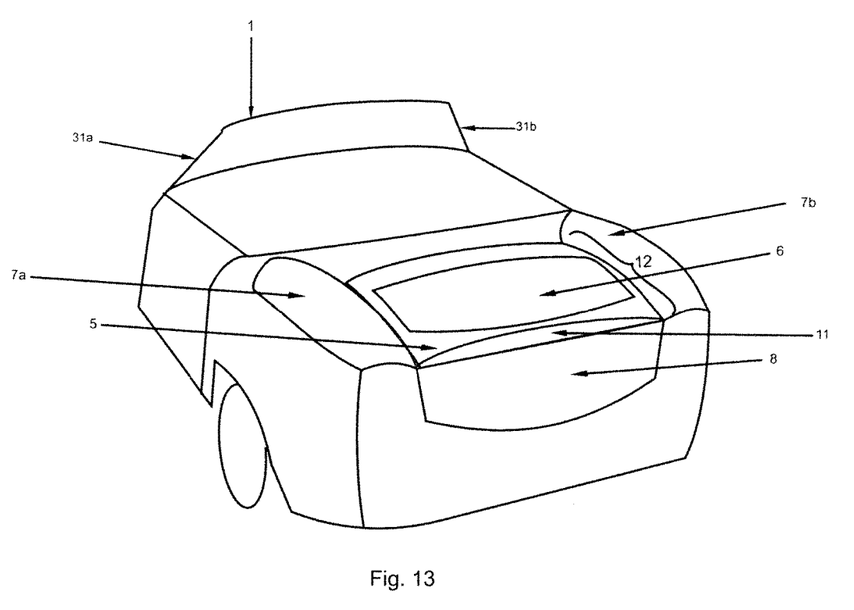
FIG. 13 is a top view from the left rear end of the vehicle showing the end of the opening process when the top of the back wings are closed.

The opening process of the hard top ends by returning to the closed position of the 7a and 7b (FIG. 13).

The closing process of the hard top runs by following the above steps in reverse order.

I claim:

1. A hard-top convertible vehicle system with two assemblies, each assembly comprising:
    a horizontal element;
    a connecting segment;
    a rear pillar; and
    a rear wing having a top which opens to provide access to a storage area in a respective lateral part of a trunk of a vehicle,
    wherein the horizontal elements are symmetric,
    when the assemblies are extended, the horizontal elements are joined at a seam oriented along a longitudinal axis of the vehicle, and
    wherein the rear pillars, the connecting segments and the horizontal elements fold compactly so that each assembly enters the respective storage area.

2. The convertible system according to claim 1, wherein the horizontal elements from each assembly detach from one another along the longitudinal axis of the vehicle by raising lateral sides of the respective horizontal elements away from the connecting segment of the corresponding assembly.

3. The convertible system according to claim 2, wherein the system further comprises a panel that includes a frame and a rear window of the vehicle, the panel being movable from a first position in which the frame is fixed above a trunk lid of the vehicle.

4. The convertible system according to claim 3, further comprising two arms that move the panel,
    wherein, when the two assemblies are disposed in the respective storage areas, a base of each of the two arms is detachable from the frame so that the panel moves together with the trunk lid when the trunk lid is opening or closing.

* * * * *